(12) United States Patent
Hsu

(10) Patent No.: US 11,498,468 B2
(45) Date of Patent: Nov. 15, 2022

(54) VEHICLE INGRESS-EGRESS SUPPORT

(71) Applicant: HONDA MOTOR CO., LTD., Tokyo (JP)

(72) Inventor: Ricky Jukuei Hsu, Rancho Palos Verdes, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 457 days.

(21) Appl. No.: 16/667,467

(22) Filed: Oct. 29, 2019

(65) Prior Publication Data

US 2021/0122278 A1 Apr. 29, 2021

(51) Int. Cl.
*B60N 5/00* (2006.01)
*B60N 2/14* (2006.01)
(Continued)

(52) U.S. Cl.
CPC ............... *B60N 5/00* (2013.01); *B25J 5/007* (2013.01); *B25J 13/08* (2013.01); *B60J 5/0473* (2013.01);
(Continued)

(58) Field of Classification Search
CPC . B60N 5/00; B60N 2/002; B60N 2/14; B60N 2/1635; B60N 2/245; B60N 2002/022; B60N 2002/247; B60N 3/026; B25J 5/007; B25J 5/0473; B25J 9/16; B25J 9/1633; B25J 9/1664; B25J 13/08;
(Continued)

(56) References Cited

U.S. PATENT DOCUMENTS 5,577,793 A * 11/1996 Kobasic ............... B62D 31/02
296/146.12
6,223,364 B1 5/2001 Egan
(Continued)

FOREIGN PATENT DOCUMENTS

CN 103158658 A 6/2013
CN 107877493 A 4/2018
(Continued)

OTHER PUBLICATIONS

Verdiere, "Movable Footstep For A Vehicle", Dec. 16, 1998, European Patent Office, Edition: FP0884218A1 (Year: 1998).*

*Primary Examiner* — Dennis H Pedder
*Assistant Examiner* — Joyce Eileen Hill
(74) *Attorney, Agent, or Firm* — ArentFox Schiff LLP

(57) ABSTRACT

Aspects of the present disclosure include a vehicle having a passenger assistance system for facilitating ingress and egress of passengers. The vehicle may include a plurality of wheels. The vehicle may include a body including at least one doorway supported on the plurality of wheels via a suspension. The vehicle may include a door movable between an open position and a closed position covering the at least one doorway. The vehicle may include a first platform movable between a horizontal position beneath a bottom of the doorway and a stowed position parallel to the door. The vehicle may include an occupant compartment within the body. The occupant compartment may include a seat rotatable to face the doorway in an ingress or egress mode. The occupant compartment may include a robotic arm configured to extend along an ingress or egress path through the doorway.

15 Claims, 7 Drawing Sheets

(51) Int. Cl.
    *B60N 2/00*     (2006.01)
    *B60N 2/24*     (2006.01)
    *B60N 2/16*     (2006.01)
    *B60N 2/02*     (2006.01)
    *B60J 5/04*     (2006.01)
    *B60R 3/02*     (2006.01)
    *B60R 3/00*     (2006.01)
    *B25J 5/00*     (2006.01)
    *B25J 13/08*     (2006.01)
    *G01G 19/44*     (2006.01)

(52) U.S. Cl.
    CPC ............... *B60N 2/002* (2013.01); *B60N 2/14* (2013.01); *B60R 3/02* (2013.01); *G01G 19/44* (2013.01); *B60J 5/047* (2013.01); *B60N 2/1635* (2013.01); *B60N 2/245* (2013.01); *B60N 2002/022* (2013.01); *B60R 3/002* (2013.01)

(58) Field of Classification Search
    CPC .. B25J 5/00; B60J 5/0473; B60J 5/047; B60R 3/02; B60R 3/002; B60R 11/00; G01G 19/44; A61G 3/02; A61G 3/062; B60P 1/44; B60P 1/4414; Y10S 414/134; Y10T 74/20305
    USPC ................ 296/65.06, 65.07, 65.08, 146.11; 414/541, 545, 921; 5/81.1 R, 83.1, 87.1; 280/163; 49/40, 41
See application file for complete search history.

(56) References Cited

U.S. PATENT DOCUMENTS

| | | | |
|---|---|---|---|
| 7,322,636 B1 * | 1/2008 | Woodhouse | B60J 5/0477 |
| | | | 296/147 |
| 7,651,313 B1 | 1/2010 | Egan | |
| 2018/0009348 A1 | 1/2018 | Deshmukh | |
| 2018/0043832 A1 * | 2/2018 | Okuyama | B60R 3/02 |
| 2018/0193210 A1 * | 7/2018 | Aitchison | B60N 2/14 |
| 2019/0358818 A1 * | 11/2019 | Kanitz | B25J 15/0206 |

FOREIGN PATENT DOCUMENTS

| | | | |
|---|---|---|---|
| DE | 102008018556 A1 | 10/2009 | |
| DE | 102009004734 A1 | 7/2010 | |
| EP | 884218 A1 * | 12/1998 | ............... B60R 3/02 |
| EP | 3 189 822 B1 | 12/2018 | |
| FR | 2506154 A1 | 11/1982 | |
| GB | 2 417 021 A | 2/2006 | |
| JP | 2005-088095 A | 4/2005 | |

\* cited by examiner

VEHICLE INGRESS-EGRESS SUPPORT

TECHNICAL FIELD

The present disclosure generally relates to ingress and egress of occupants of a vehicle.

BACKGROUND

Conventional vehicles may include many features to improve vehicle performance, fuel economy, and occupants' comfort and enjoyment in order to fulfill the needs and/or lifestyles of different occupants. For example, occupants may utilize traditional vehicles for routine tasks, such as commuting to work and running errands, as well as leisure functions such as embarking on short range or long range road trips. To accommodate various functions, versatility in seating arrangement may be desirable.

Conventional passenger vehicles include driver-side and passenger-side front seats normally oriented facing a forward direction of travel. Vehicle seats generally include controls for adjusting the position of the seat. More advanced vehicle seats include power movement, adjustable lumbar support, adjustable side bolsters, seat and back heating, sound systems, and ventilation systems.

Conventional passenger vehicle seating, however, is typically limited to fixed locations for each seat. For example, seats are arranged in forward facing rows. Even special purpose vehicles such as limousines typically have a fixed seating arrangement. In an autonomous vehicle, however, a fixed location for vehicle operator and/or passenger seats may not be necessary.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure may include a vehicle. The vehicle may include a plurality of wheels and a body including at least one doorway supported on the plurality of wheels via a suspension. The vehicle may include a door movable between an open position and a closed position covering the at least one doorway. The vehicle may include a first platform movable between a horizontal position beneath a bottom of the doorway and a stowed position parallel to the door. The vehicle may include an occupant compartment within the body. The occupant compartment may include a seat rotatable to face the doorway in an ingress or egress mode. The occupant compartment may include a robotic arm configured to extend along an ingress or egress path through the doorway.

In another aspect, the disclosure includes a passenger assistance system for a vehicle. The passenger assistance system may include a first platform movable between a horizontal position beneath a bottom of a vehicle doorway and a stowed position parallel to a vehicle door. The passenger assistance system may include a seat rotatable to face the door in an ingress or egress mode. The passenger assistance system may include a robotic arm configured to extend along an ingress or egress path through the vehicle doorway.

In another aspect, the disclosure provides a method of assisting a passenger to enter or exit a vehicle. The method may include moving a first platform from a stowed position parallel to a vehicle door to a horizontal position beneath a bottom of a vehicle doorway. The method may include rotating a seat to face the doorway. The method may include extending a robotic arm along an ingress or egress path through the doorway.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, ATVs, generators, lawnmowers boats, personal watercraft, and aircraft. In some cases, a motor vehicle includes one or more motors or engines.

Some passengers may have difficulty entering or exiting a conventional vehicle. For example, an elderly passenger may have difficulty climbing into relatively higher conventional vehicles such as SUVs or may have trouble getting out of relatively lower conventional vehicles such as sedans. Other passengers with mobility issues or who are not average size may also have trouble entering and exiting vehicles. Additionally, obstacles such as interfering seats and narrow doors may pose difficulties for passengers.

Figure 1:
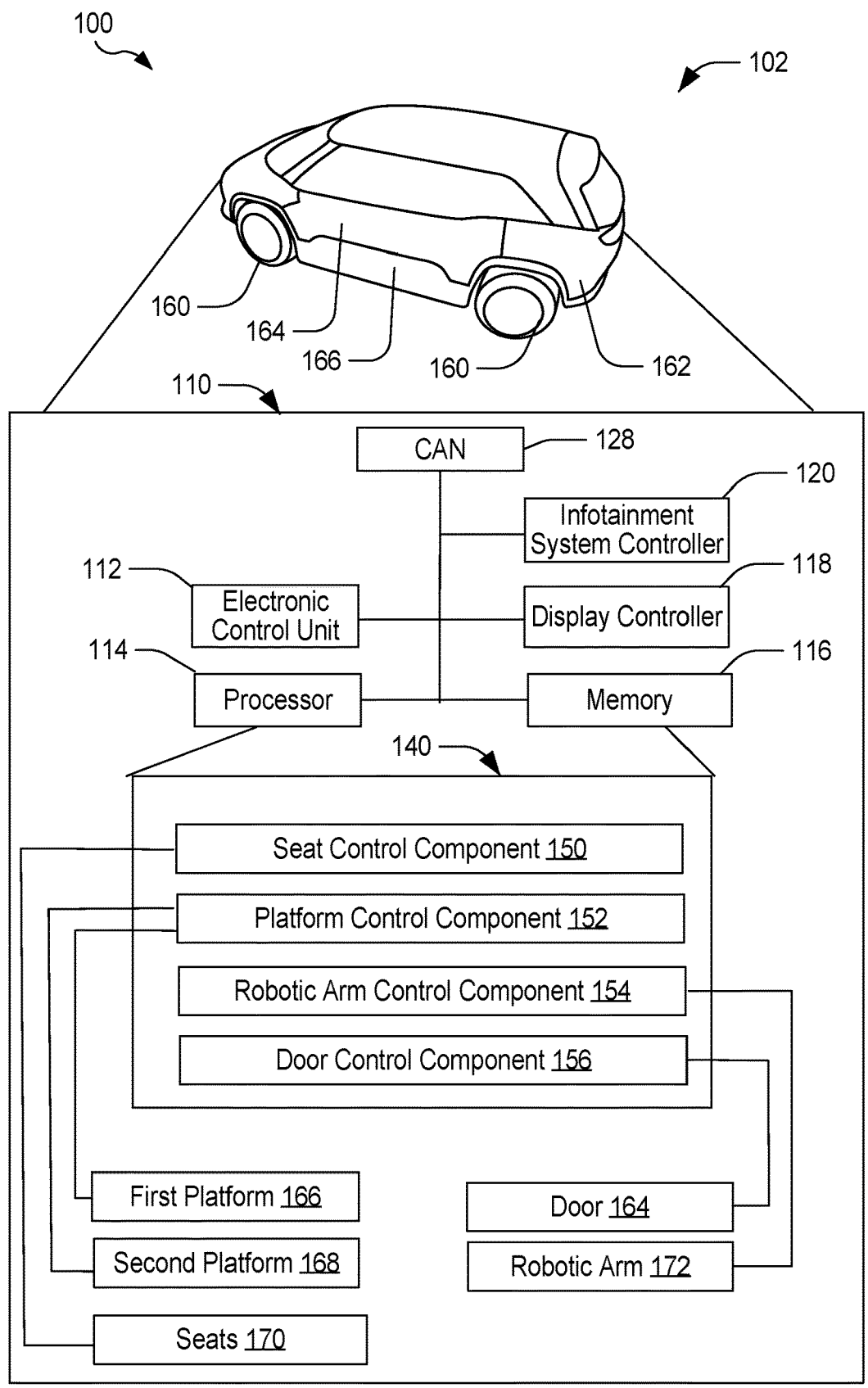
FIG. 1 illustrates a schematic view of an example operating environment of a passenger ingress-egress support system in accordance with aspects of the present disclosure.

Turning to FIG. 1, a schematic view of an example operating environment 100 of a passenger ingress-egress support system 110 and example methods according to an aspect of the disclosure are provided. The a passenger ingress-egress support system may reside within a vehicle 102. The components of the passenger ingress-egress support system 110, as well as the components of other systems, hardware architectures, and software architectures discussed herein, may be combined, omitted or organized into various implementations.

The vehicle 102 may be a passenger vehicle, such as a sedan, coupe, sports-utility vehicle, pick-up truck, van, mini-van, bus, etc. The vehicle 102 may be a self-driving vehicle. For example, the vehicle 102 may be a level 3 driving automation vehicle. For a level 3 automation vehicle, the vehicle operator may safely turn his/her attention away from the driving tasks (e.g., conversing with others, texting, eating). The level 3 vehicle may handle situations that require immediate responses, but may solicit vehicle operator feedback in some circumstances. Alternatively, the vehicle 102 may be a level 4 driving automation vehicle. For a level 4 automation vehicle, the control system may be in substantially complete control of the vehicle with minimum vehicle operator input necessary. While the vehicle operator may control the vehicle if desired, the level 4 automation vehicle may safely and autonomously operate. In another aspect, the vehicle 102 may be a level 5 driving automation vehicle. For a level 5 driving automation vehicle, the control system may be in complete control of the vehicle with no direct operator control.

The passenger ingress-egress support system 110 may provide support for a passenger to enter or exit the vehicle 102. The vehicle 102 may include a plurality of wheels (e.g., 4 wheels) 160, a body 162, and a door 164. The wheels 160 may support the body 162 via a suspension. The body 162 may include a doorway that allows a passenger to enter or exit the vehicle 102. The doorway may be closed by a door 164. In an aspect, the door 164 may be a vertically opening door such as a gull-wing door. For instance, the door 164 may be mounted via one or more hinges that extend along a longitudinal axis of the vehicle 102. A vertically opening door may allow for a larger unobstructed doorway than a vehicle of the same size having horizontally opening doors. The door 164 may be assisted in opening or closing. For example, the door 164 may be controlled by an electric motor. In an aspect, the door 164 may be biased to an open position (e.g., by spring or pneumatic cylinder) for ease of manual opening.

The passenger ingress-egress support system 110 may include a first platform 166. The first platform 166 may be movable between a horizontal position beneath a bottom of the doorway and a stowed position parallel to the door 164. For example, the first platform 166 may be mounted to two hinges located on opposite sides of the doorway and the door 164. The first platform 166 may rotate between the horizontal position and the stowed position. In the horizontal position, the first platform 166 may be elevated above the ground to serve as a step into the vehicle 102. The range of motion of the first platform may be limited such that the first platform 166 does not rotate past horizontal. The first platform may include an electric actuator configured to lift the first platform to the stowed position parallel to the door 164 when the door 164 is closed. For example, the door 164 may include a depression along a bottom edge into which the first platform 166 fits to form a flat aerodynamic surface. In the stowed position, the first platform 166 may secure the door 164 in the closed position. In an aspect, the first platform 166 may be biased toward the horizontal position (e.g., by gravity) to facilitate manually opening the door. For example, The vehicle 102 may generally include an electronic control unit (ECU) 112 that operably controls a plurality of vehicle systems. The vehicle systems may include, but are not limited to, the passenger ingress-egress support system 110 and a vehicle infotainment systems 120, among others, including vehicle body monitoring systems, vehicle HVAC systems, vehicle audio systems, vehicle video systems, vehicle telephone systems, and the like. The passenger ingress-egress support system 110 may also include a processor 114 and a memory 116 that communicate with the ECU 112, display controller 118, infotainment system controller 120, and controller area network (CAN) 128. The processor 114 may execute instructions stored in the memory 116 for performing one or more of the function of the passenger ingress-egress support system 110, for example, by controlling a component of the passenger ingress-egress support system 110.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the passenger ingress-egress support system 110.

The processor 114 and memory 116 may include a seat control component 150, a platform control component 152, a robotic arm control component 154, and a door control component 156. The seat control component 150 may be configured to control the transverse position and/or the rotation of one or more seats (described in more detail below). The robotic arm control component 154 may be configured to control the robotic arm 172 (described below). The door control component 156 may be configured to control the door 164 (described above). In certain examples, the seat control component 150, the platform control component 152, the robotic arm control component 154, and/or the door control component 156 may be implemented as hardware in the processor 114, as software stored in the memory 116, or a combination of hardware and software.

Figure 2:
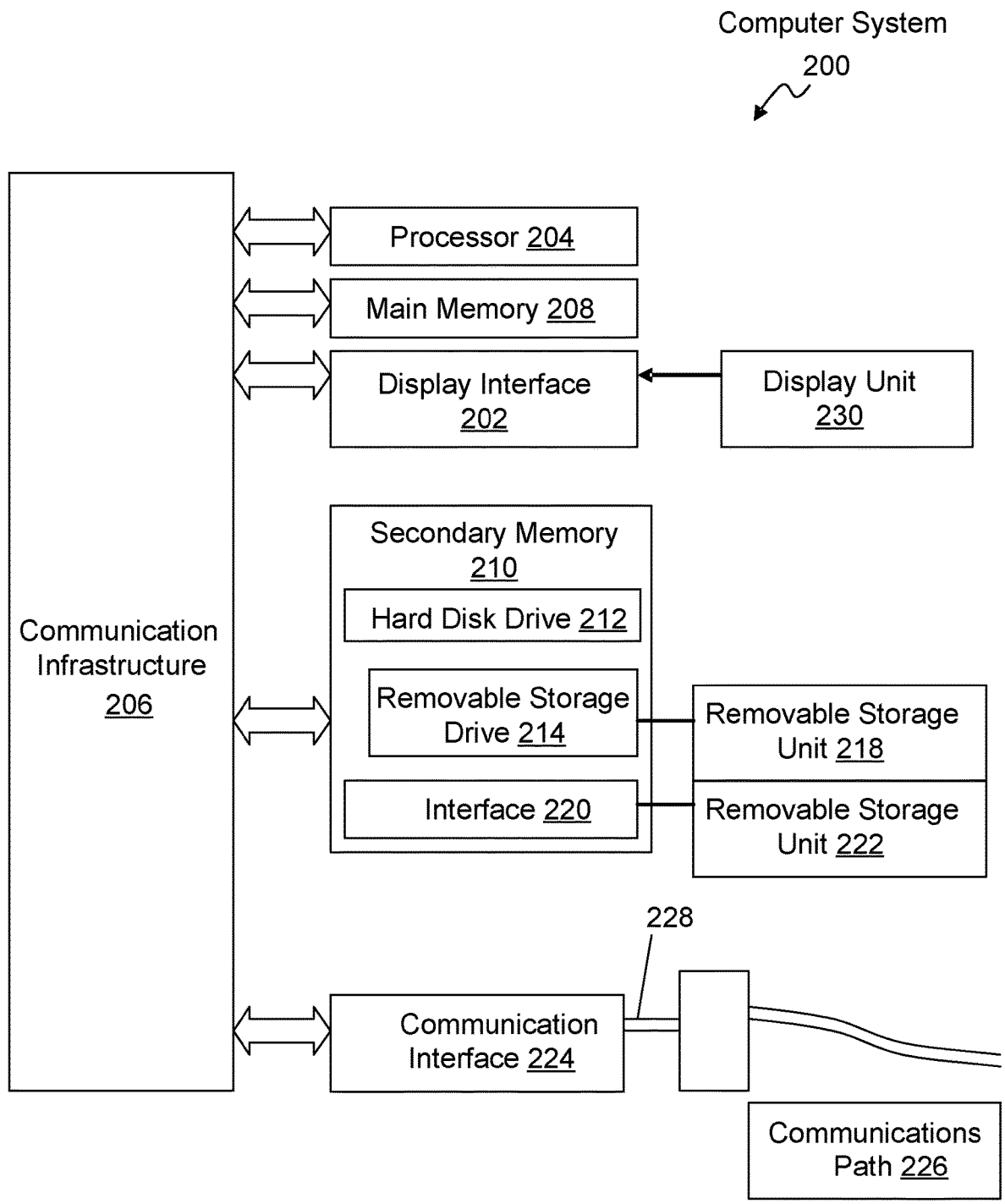
FIG. 2 illustrates an example of a computer system for implementing a method of controlling passenger ingress-egress support features in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. For example, features of the ECU 112 may be implemented as one or more computer systems described in FIG. 2. An example of such the computer system 200 is shown in FIG. 2.

The computer system 200 includes one or more processors, such as the processor 204. The processor 204 is connected to a communication infrastructure 206 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The computer system 200 may include a display interface 202 that forwards graphics, text, and other data from the communication infrastructure 206 (or from a frame buffer not shown) for display on a display unit 230. Computer system 200 also includes a main memory 208, preferably random access memory (RAM), and may also include a secondary memory 210. The secondary memory 210 may include, for example, a hard disk drive 212, and/or a removable storage drive 214, representing a floppy disk drive, a magnetic tape drive, an optical disk drive, a universal serial bus (USB) flash drive, etc. The removable storage drive 214 reads from and/or writes to a removable storage unit 218 in a well-known manner. Removable storage unit 218 represents a floppy disk, magnetic tape, optical disk, USB flash drive etc., which is read by and written to removable storage drive 214. As will be appreciated, the removable storage unit 218 includes a computer usable storage medium having stored therein computer software and/or data.

Alternative aspects of the present disclosure may include secondary memory 210 and may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, an RF link and/or other communications channels. In this document, the terms "computer program medium" and "computer usable medium" are used to refer generally to media such as a removable storage unit 218, a hard disk installed in hard disk drive 212, and signals 228. These computer program products provide software to the computer system 200. Aspects of the present disclosure are directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features in accordance with aspects of the present disclosure, as discussed herein. In particular, the computer programs, when executed, enable the processor 204 to perform the features in accordance with aspects of the present disclosure. Accordingly, such computer programs represent controllers of the computer system 200.

In an aspect of the present disclosure where the method is implemented using software, the software may be stored in a computer program product and loaded into computer system 200 using removable storage drive 214, hard drive 212, or communications interface 220. The control logic (software), when executed by the processor 204, causes the processor 204 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 3:
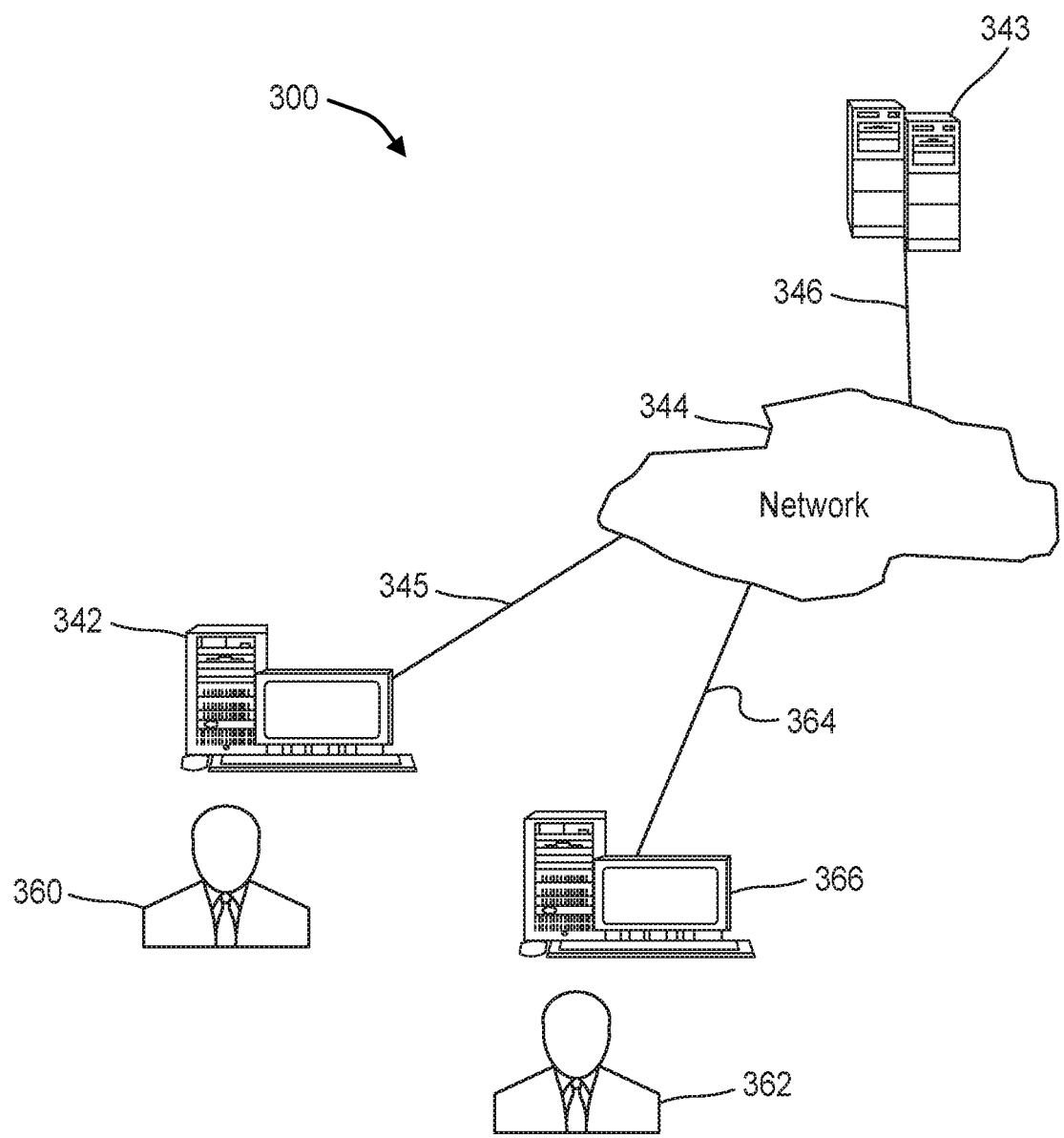
FIG. 3 illustrates a block diagram of various example system components, in accordance with aspects of the present disclosure.

FIG. 3 illustrates a block diagram of various example system components, in accordance with an aspect of the present disclosure. FIG. 3 shows a communication system 300 usable in accordance with aspects of the present disclosure. The communication system 300 includes one or more accessors 360, 362 (also referred to interchangeably herein as one or more "users") and one or more terminals 342, 366. In one aspect, data for use in accordance with aspects of the present disclosure is, for example, input and/or accessed by accessors 360, 362 via terminals 342, 366, such as personal computers (PCs), minicomputers, mainframe computers, microcomputers, telephonic devices, or wireless devices, such as personal digital assistants ("PDAs") or a hand-held wireless devices coupled to a server 343, such as a PC, minicomputer, mainframe computer, microcomputer, or other device having a processor and a repository for data and/or connection to a repository for data, via, for example, a network 344, such as the Internet or an intranet, and couplings 345, 346, 364. The couplings 345, 346, 364 include, for example, wired, wireless, or fiberoptic links. In another example variation, the method and system in accordance with aspects of the present disclosure operate in a stand-alone environment, such as on a single terminal.

Figure 4:
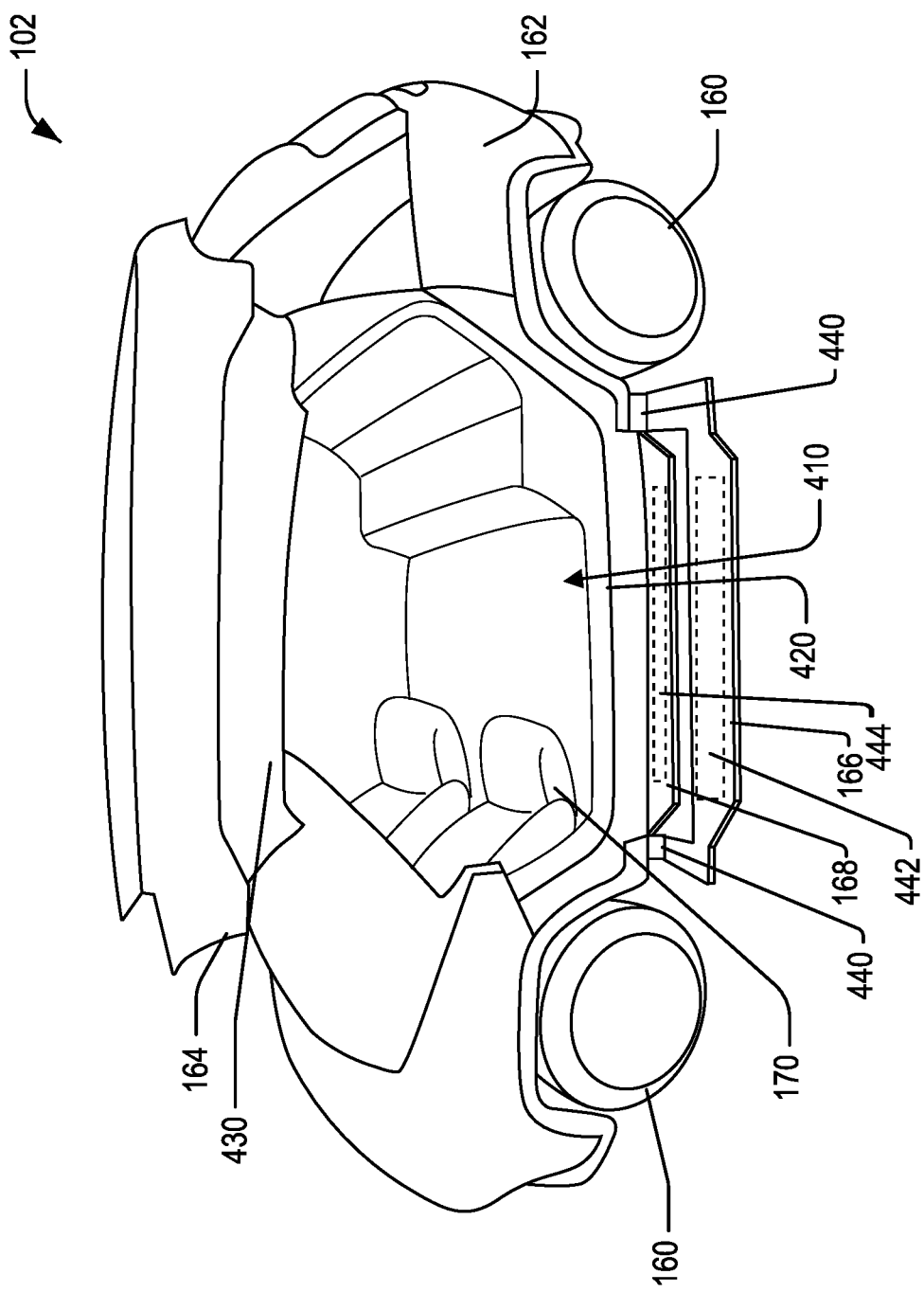
FIG. 4 illustrates a perspective view of an example of a vehicle including platforms for assisting passengers, in accordance with aspects of the present disclosure.

Referring to FIG. 4, an example of a vehicle 102 including certain aspects of the present disclosure is shown. Certain features and components of the vehicle 102 may be omitted for clarity. In some implementations, the vehicle 102 may include the body 162, one or more tires, which may be mounted on wheels 160, one or more doors 164, the first platform 166, the second platform 168, and an occupant compartment 410. The occupant compartment 410 may include one or more seats 170.

The body 162 may include external walls defining a doorway 420. Passengers may pass through the doorway 420 when entering or exiting the vehicle 102. As illustrated, the door 164 may be mounted to the body 162 at one or more hinges 430 arranged along a longitudinal axis of the vehicle 102. Accordingly, the door 164 may open vertically, which may provide a larger doorway than a horizontally opening door. The doorway 420 may allow passengers to more easily enter or exit the vehicle 102.

The first platform 166 and/or the second platform 168 may provide one or more steps to facilitate entering or exiting the vehicle 102. As illustrated, the first platform 166 is in a horizontal position beneath a bottom of the doorway 420. The horizontal position of the first platform 166 may also be lower than the second platform 168. The first platform 166 may be mounted to the body 162 via hinges 440. The hinges 440 may allow the first platform 166 to rotate between the horizontal position and the vertical position illustrated in FIG. 1. The hinges 440 may prevent rotation of the first platform 166 past the horizontal position such that the first platform 166 may support the weight of one or more passengers. The first platform 166 may include a sensor 442 and the second platform 168 may include a sensor 444. The first platform 166 may include a cutout between the hinges 440 such that the first platform 166 may rotate over the second platform 168.

The second platform 168 may be mounted under the doorway 420. The second platform 168 may translate laterally from a position under the doorway 420 to a position extending laterally out from under the doorway 420. For example, the second platform 168 may be mounted on rollers or ball bearings to allow the lateral translation. The second platform 168 may be moved laterally by, for example, a threaded shaft driven by an electric motor. The second platform 168 may extend between the hinges 440. Accordingly, the first platform 166 and the second platform 168 may be operated independently to provide one or two steps as needed.

Figure 5:
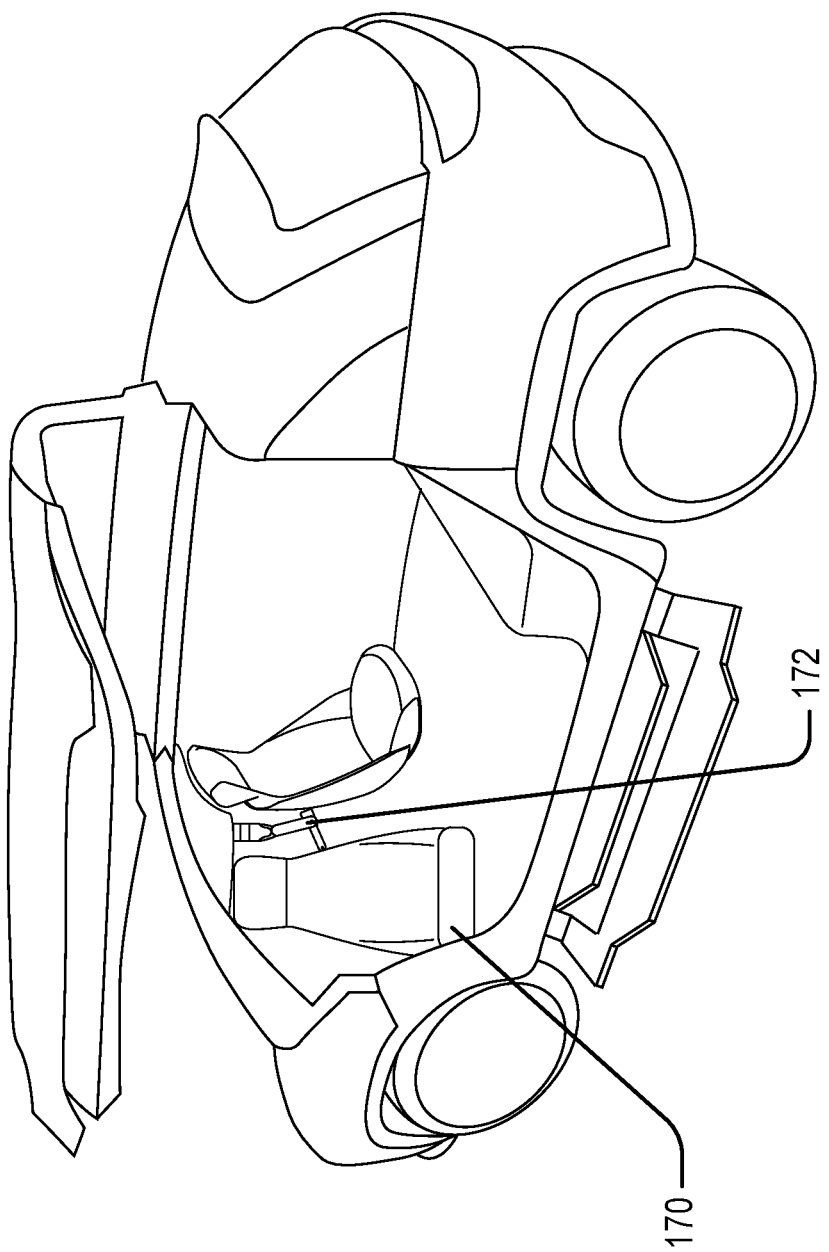
FIG. 5 illustrates a perspective view of an example of a vehicle including a rotatable seat and robotic arm, in accordance with aspects of the present disclosure.
Figure 6:
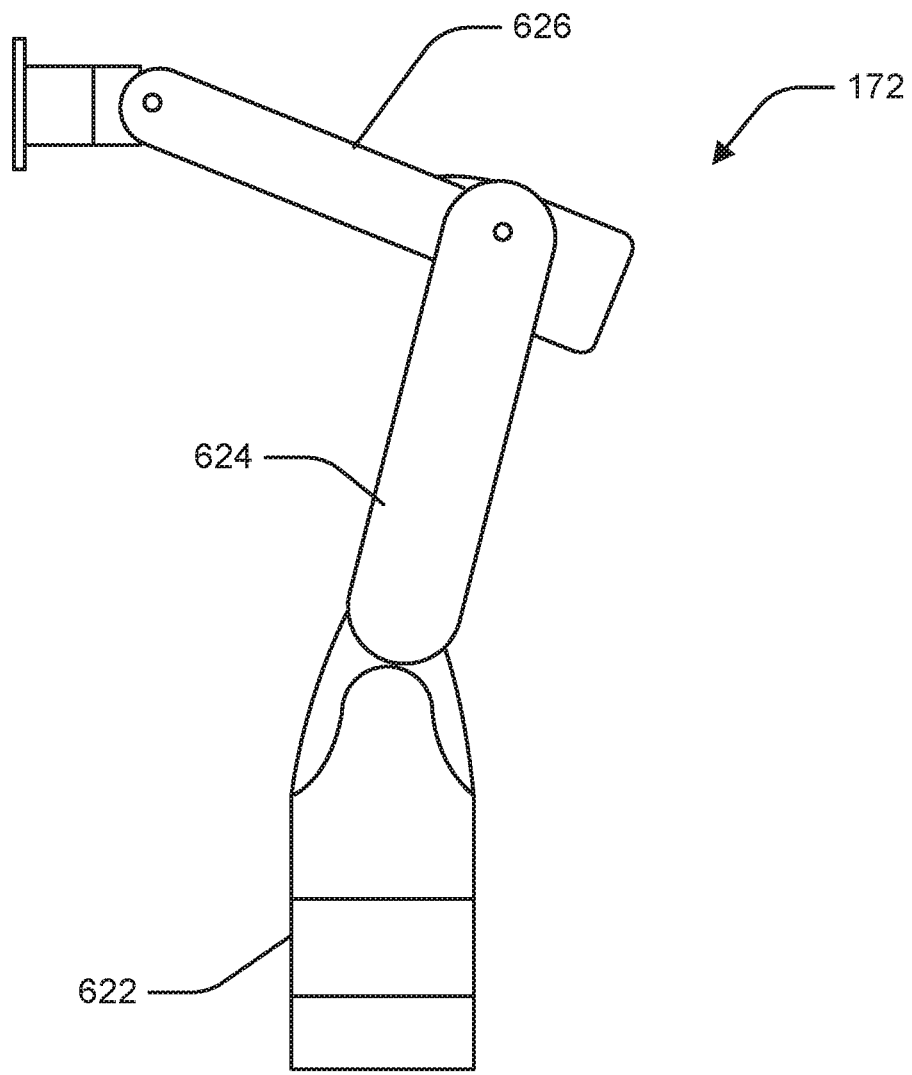
FIG. 6 illustrates an example robotic arm, in accordance with aspects of the present disclosure.

Turning to FIG. 5, a perspective view of the vehicle 102 includes the seat 170 and the robotic arm 172 for assisting a passenger entering or exiting the vehicle 102. The robotic arm 172 may be mounted behind the seat 170. For example, the robotic arm 172 may be attached to a base or back of the seat 170 or may be attached to a vehicle floor adjacent to the seat 170. The robotic arm 172 may extend along an ingress or egress path to assist a passenger exiting or entering the vehicle 102. For example, the robotic arm 172 may be positioned at a height near a hip of the passenger to act as a handrail. In an aspect, the robotic arm may move vertically, for example, as the passenger uses the first platform 166 and the second platform 168 as steps. Further details of the robotic arm 172 are described with respect to FIG. 6.

The seat 170 may rotate outward (facing the doorway 420) to facilitate ingress/egress of the occupants. For example, the seat 170 may include a rotatory actuator to rotate the seat 170 to a desired direction. In an aspect, the rotatory actuator may provide full rotation of the seat 170 to any direction. For example, the seat 170 may be rotated to face forward, backward, or to a side (e.g., facing the doorway 420). In an aspect, the seat 170 may translate linearly along a track between a first position and a second position. The seat 170 may be driven to translate linearly between the first position and the second position along the track using a worm drive (not shown), for example, as known to one skilled in the art. The worm shaft may be disposed in the track and the worm wheel may be disposed in the seat 170 in a non-limiting example. Other configurations may also be implemented, such as a sail winch servo, a screw actuator, a wheel and axle actuator, a cam actuator, or other suitable linear actuators.

In some implementations, a seat 170 may be a collapsible seat assembly. The collapsible seat assembly may include one or more pneumatic bladder members to provide at least a base portion and seatback portion of the seat when inflated, and a plurality of internal rigid frame members that can provide a collapsing action to facilitate collapsing the seat assembly at least when the one or more pneumatic bladder members are in a deflated state. For example, the internal rigid frame members may be disposed at least partially within some of the one or more pneumatic bladder members. In the described configuration, the one or more pneumatic bladder members may also provide a level of support for a body seated in the seat assembly, which may allow for using less and/or lighter materials for the internal rigid frame members. Additionally, the one or more pneumatic bladder members may be composed of lightweight materials. In this regard, using the collapsible seat assembly described herein in a vehicle may result in a lighter weight seat assembly than fabric seats conventionally used in vehicles, though the use of the collapsible seat assembly described herein may not be limited to vehicles. In addition, using collapsible seats may bring more flexibility to vehicle interior configuration by allowing simplified movement, addition, removal, etc. of seat assemblies within the vehicle interior. Moreover, the one or more pneumatic bladder members may provide increased flexibility in seat adjustment, which may include but may not be limited to back support, lumbar support, headrest position, etc. For example, the one or more pneumatic bladder members can allow for (e.g., by inflating/deflating bladder members) functional changes to the seat assembly, such as a wider but open seat for luxury feel, a tight deep seat for a sporty feel, etc.

Additionally, one or more of the plurality of internal rigid frame members may be collapsible such to collapse the seat assembly when the one or more pneumatic bladder members are in a deflated state. For example, a given internal rigid frame member may have a telescoping action such that a portion of the internal rigid frame member telescopes within itself to shorten or extend. In another example, the internal rigid frame member may additionally or alternative have a folding action (e.g., provided by a hinge, flexible material, etc.) such that the portion of the internal rigid frame member can fold over, or otherwise be foldably connected to, another portion to shorten the internal rigid frame member. Allowing collapsing of the internal rigid frame member in this regard can lessen the size of the seat assembly, which may facilitate easier transport of the seat assembly. In addition, in one example, the seat assembly may include a strap that may at least one of retain the seat assembly in a collapsed state and/or facilitate collapsing the internal rigid frame members, deflating the one or more pneumatic bladder members, etc. In a non-limiting example, the seat 170 may be covered in polyester, nylon, vinyl, leather, faux leather, and/or other suitable materials.

The robotic arm 172 may include a rotational joint 622 that rotates the robotic arm 172, a first robotic arm segment 624, and a second robotic arm segment 626. The rotational joint 622 that allows full rotation of the robotic arm 172. For example, the rotational joint 622 may include a swivel, universal joint, ball and socket, or track and ball bearings. In an aspect, the rotational joint 622 may be mounted to a floor of the vehicle 102 or to the seat 170.

The first robotic arm segment 624 and the second robotic arm segment 626 may be attached to the rotational joint 622. The first robotic arm segment 624 and the second robotic arm segment 626 may each include an actuator for rotating the respective segment. For example, the first robotic arm segment 624 may rotate with respect to the rotational joint 622, and the second robotic arm segment 626 may rotate with respect to the first robotic arm segment 624. The actuator may be, for example, an electric motor that drives a worm gear to precisely move the respective segment of the robotic arm. Further, the robotic arm may remain in a set position when no electric current is applied to the actuator. Accordingly, the robotic arm 172 may remain stationary to assist a passenger during ingress or egress. Alternatively, the robotic arm 172 may be configured to dynamically assist the passenger, for example, by raising or lowering a weight of the passenger based on a position of the passenger. For example, when the sensor 442 on the first platform 166 and the sensor 444 on the second platform 168 detect a step from the first platform 166 to the second platform 168 (e.g., the sensor 448 for the second platform 168 sensing an increased load), the robotic arm 172 may be controlled to slowly increase the height of the second robotic arm segment 626 such that the passenger may be lifted to the second platform 168.

Figure 7:
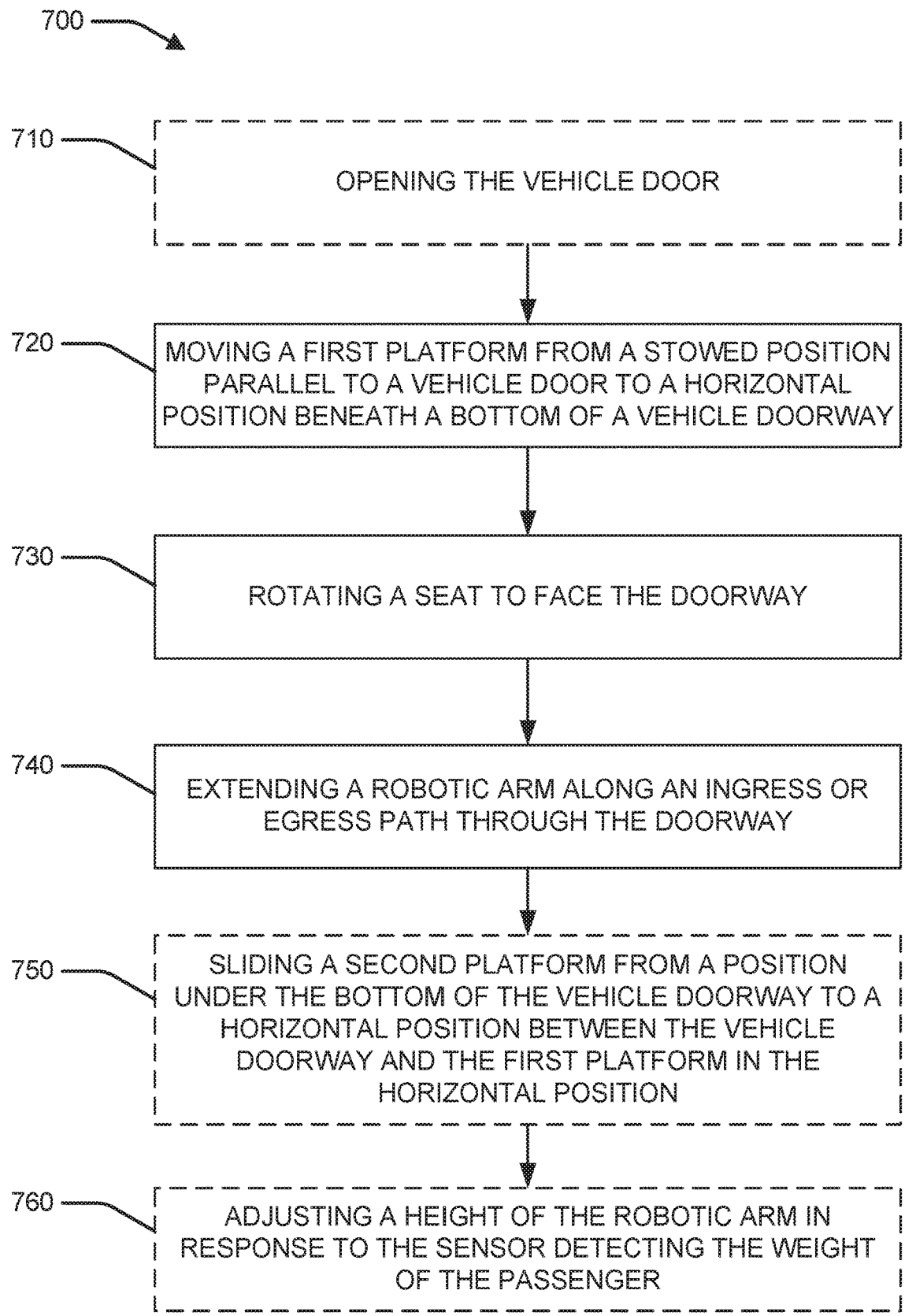
FIG. 7 illustrates a flowchart of an example method of operating a passenger assistance system within a vehicle, in accordance with aspects of the present disclosure.

FIG. 7 illustrates a flowchart of an example method 700 for controlling a vehicle passenger assistance system (e.g., the passenger ingress-egress support system 110). The method 700 may be performed by the assistance control component 140 in communication with other components of the passenger ingress-egress support system 110 within a vehicle 102. Optional blocks are shown in dashed lines.

At block 710, the method 700 may optionally include opening the vehicle door. In an aspect, for example, the door control component 156 may open the vehicle door 164. In an implementation, the door control component 156 may release a latch securing the door in a closed position. In an aspect, the door 164 may be biased to open (e.g., by a pneumatic actuator) and may automatically open once unlatched. In another aspect, the door control component 156 may control an actuator to open the door 164.

At block 720, the method 700 may include moving a first platform from a stowed position parallel to a vehicle door to a horizontal position beneath a bottom of a vehicle doorway. In an aspect, for example, the platform control component 152 may move the first platform 166 from the stowed position parallel to the vehicle door 164 (e.g., as illustrated in FIG. 1) to a horizontal position beneath a bottom of the vehicle doorway (e.g., as illustrated in FIG. 4). For example, the platform control component 152 may control an actuator to lower the first platform 166.

At block 730, the method 700 may include rotating a seat to face the doorway. In an aspect, for example, the door control component 156 may rotate the seat 170 to face the doorway 420. For instance, the door control component 156 may drive the rotatory actuator to rotate the seat 170.

At block 740, the method 700 may include extending a robotic arm along an ingress or egress path through the doorway. In an aspect, for example, the robotic arm control component 154 may extend the robotic arm 172 along the ingress or egress path through the doorway 420. In an implementation, the robotic arm control component 154 may control the rotational joint 622 to rotate the first robotic arm segment 624 and the second robotic arm segment 626 toward the ingress or egress path. The robotic arm control component 154 may control the actuators for the first robotic arm segment 624 and the second robotic arm segment 626 to extend the robotic arm 172 along the path.

At block 750, the method 700 may optionally include sliding a second platform from a position under the bottom of the vehicle doorway to a horizontal position between the vehicle doorway and the first platform in the horizontal position. In an aspect, for example, the platform control component 152 may slide the second platform from the position under the bottom of the vehicle doorway 420 to the horizontal position between the vehicle doorway 420 and the first platform 166 in the horizontal position (e.g., as illustrated in FIG. 4). For instance, the platform control component 152 may drive an electric motor to turn the threaded shaft to drive the second platform 168.

At block 760, the method 700 may optionally include adjusting a height of the robotic arm in response to the sensor detecting the weight of the passenger. In an aspect, for example, the robotic arm control component 154 may adjust the height of the robotic arm 172 in response to the sensor on the first platform 166 and/or on the second platform 168 detecting the weight of the passenger. For instance, the robotic arm control component 154 may move the robotic arm in a direction of travel of the passenger.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A vehicle, comprising:
a plurality of wheels;
a body including at least one doorway supported on the plurality of wheels via a suspension;
a door movable between an open position and a closed position covering the at least one doorway;
a first platform movable between a horizontal position beneath a bottom of the doorway and a stowed position parallel to the door;
and
an occupant compartment within the body including:
a seat rotatable to face the doorway in an ingress or egress mode; and
a robotic arm configured to extend along an ingress or egress path through the doorway in the ingress or egress mode and move in a direction of travel of a passenger,
wherein the first platform includes a sensor that detects a weight of a passenger, wherein the robotic arm is configured to respond to the sensor detecting the weight of the passenger.

2. The vehicle of claim 1, further comprising a second platform slidably mounted under the bottom of the doorway and configured to slide to a horizontal position between the doorway and the first platform in the horizontal position.

3. The vehicle of claim 2, wherein the first platform is mounted to the body by two hinges located on opposite sides of the doorway, wherein the second platform extends between the two hinges.

4. The vehicle of claim 1, wherein the robotic arm is configured to adjust a height based on a location of the sensor that detects the weight of the passenger.

5. The vehicle of claim 1, wherein the door is a gull-wing door mounted at a top edge of the door to a horizontal hinge extending along a longitudinal axis of the vehicle.

6. The vehicle of claim 5, wherein the first platform overlaps a bottom edge of the door when the door is closed and the platform is in the stowed position.

7. A passenger assistance system for a vehicle, comprising:
- a first platform movable between a horizontal position beneath a bottom of a vehicle doorway and a stowed position parallel to a vehicle door;
- a seat rotatable to face the vehicle doorway in an ingress or egress mode; and
- a robotic arm configured to extend along an ingress or egress path through the vehicle doorway in the ingress or egress mode and move in a direction of travel of a passenger,
- wherein the first platform includes a sensor that detects a weight of a passenger, wherein the robotic arm is configured to respond to the sensor detecting the weight of the passenger.

8. The passenger assistance system of claim 7, further comprising a second platform slidably mounted under the bottom of the vehicle doorway and configured to slide to a horizontal position between the vehicle doorway and the first platform in the horizontal position.

9. The passenger assistance system of claim 8, wherein the first platform is mounted to the vehicle by two hinges located on opposite sides of the vehicle doorway, wherein the second platform extends between the two hinges.

10. The passenger assistance system of claim 7, wherein the robotic arm is configured to adjust a height based on a location of the sensor that detects the weight of the passenger.

11. The passenger assistance system of claim 7, wherein the vehicle door is a gull-wing door mounted at a top edge of the vehicle door to a horizontal hinge extending along a longitudinal axis of the vehicle.

12. The passenger assistance system of claim 11, wherein the first platform overlaps a bottom edge of the vehicle door when the door is closed and the platform is in the stowed position.

13. A method of assisting a passenger to enter or exit a vehicle, comprising:
- moving a first platform from a stowed position parallel to a vehicle door to a horizontal position beneath a bottom of a vehicle doorway;
- rotating a seat to face the vehicle doorway; and
- extending a robotic arm along an ingress or egress path through the vehicle doorway in an ingress or egress mode and
- moving the robotic arm in a direction of travel of a passenger, wherein the first platform includes a sensor that detects a weight of a passenger, further comprising adjusting a height of the robotic arm in response to the sensor detecting the weight of the passenger.

14. The method of claim 13, further comprising sliding a second platform from a position under the bottom of the vehicle doorway to a horizontal position between the vehicle doorway and the first platform in the horizontal position.

15. The method of claim 13, further comprising opening the vehicle door, wherein the vehicle door is a gull-wing door mounted at a top edge of the vehicle door to a horizontal hinge extending along a longitudinal axis of the vehicle.

* * * * *